US006263268B1

(12) United States Patent
Nathanson

(10) Patent No.: US 6,263,268 B1
(45) Date of Patent: Jul. 17, 2001

(54) SYSTEM AND METHOD FOR PROVIDING MOBILE AUTOMOTIVE TELEMETRY

(75) Inventor: Martin Daniel Nathanson, Montreal (CA)

(73) Assignee: Transcontech Corporation (CA)

(*) Notice: Subject to any disclaimer, the term of this patent is extended or adjusted under 35 U.S.C. 154(b) by 0 days.

(21) Appl. No.: 09/140,759

(22) Filed: Aug. 26, 1998

Related U.S. Application Data

(60) Provisional application No. 60/056,388, filed on Aug. 26, 1997.

(51) Int. Cl.[7] ........................................ G06F 7/00

(52) U.S. Cl. ................................ 701/29; 701/33; 701/35; 340/870.01; 340/870.16

(58) Field of Search ................................ 701/29, 33, 34, 701/35, 36; 370/241, 252, 242; 340/870.01, 870.16

(56) References Cited

U.S. PATENT DOCUMENTS

| | | | | |
|---|---|---|---|---|
| 2,292,387 | | 8/1942 | Markey et al. . | |
| 5,400,018 | * | 3/1995 | Scholl et al. | 340/825.54 |
| 5,535,274 | | 7/1996 | Braitberg et al. | 379/446 |
| 5,619,412 | * | 4/1997 | Hapk | 701/36 |
| 5,668,880 | | 9/1997 | Alajajian | 380/49 |
| 5,732,074 | | 3/1998 | Spaur et al. | 370/313 |
| 5,897,605 | | 4/1999 | Kohli et al. | 701/213 |
| 5,961,561 | * | 10/1999 | Wakefield, III | 701/29 |
| 6,122,514 | | 9/2000 | Spaur et al. | 455/448 |

OTHER PUBLICATIONS

"The principles of Spread Spectrum communication", Gwissces, Aug. 29, 1996, J. Glas.

"Spread Spectrum Printer", Virginia Polytechnic Institute's Spread Spectrum Introduction, date unknown.

* cited by examiner

*Primary Examiner*—William A. Cuchlinski, Jr.
*Assistant Examiner*—Yonel Beaulieu
(74) *Attorney, Agent, or Firm*—Katten Muchin Zavis

(57) ABSTRACT

A mobile automotive telemetry system for installation on-board a vehicle, includes: (i) diagnostic structure for monitoring operational functions of the vehicle and generating operational information; (ii) a memory for storing the generated operational information; and (iii) a server, in communication with the diagnostic structure and the memory. The server includes: (a) structure to receive a request from a remote client for the generated operational information; (b) structure to retrieve the generated operational information from the memory; and (c) structure to transmit the generated operational information to the remote client.

18 Claims, 1 Drawing Sheet

SYSTEM AND METHOD FOR PROVIDING MOBILE AUTOMOTIVE TELEMETRY

This application claims benefit of Provisional Application No. 60/056,388 filed Aug. 26, 1997.

BACKGROUND OF THE INVENTION

1. Field of the Invention

The present invention relates to the field of on-board automotive diagnostic systems. More specifically, the invention relates to a system and method for providing mobile automotive telemetry.

2. Description of the Prior Art

On-board automotive diagnostic systems with limited capabilities have been available since the late 1980's. Most systems comprise a so-called "On-Board Diagnostic" (OBD) module which is designed to: (i) meet the requirements of environmental legislation aimed at controlling the level of automotive pollutant emissions through effective electronic monitoring; (ii) comply with the Society of Automotive Engineer's (SAE) recommendations aimed at supplementing the emissions related monitoring capability required by legislation; and (iii) to comply with SAE recommendations for the provision of non-emissions related monitoring capabilities in order to improve the technology of vehicle fault diagnosis and servicing.

Conventional OBD modules respond to requests from off-board test equipment provided that these requests are submitted according to the protocols understood by the modules. The test equipment or so-called "scan tools" of service technicians must be physically connected to the vehicle's data bus. The responses of the OBD modules consist of analog or digital data, acquired either in real-time from sensor inputs or from an on-board data cache ("freeze-frame data").

Accordingly, conventional OBD information can only be obtained provided that the following conditions are met: (i) the test equipment incorporates a vehicle-compatible connector and vehicle data bus interface; (ii) the OBD module and the test equipment are physically connected via a cable; and (iii) the test equipment incorporates the software which implements the OBD protocols (i.e. the SAE-specified protocols discussed above).

One other disadvantage of conventional on-board automotive diagnostic systems is that diagnostic information can be obtained from the OBD module only in the form of responses to requests submitted from the test equipment.

It is an object of the present invention to obviate and mitigate at least one of the disadvantages of conventional on-board automotive diagnostic systems.

SUMMARY OF THE INVENTION

Accordingly, in one of its aspects, the present invention provides a mobile automotive telemetry system for installation on-board a vehicle, comprising:

(i) diagnostic means for monitoring operational functions of the vehicle and generating operational information;

(ii) memory for storing the generated operational information; and (iii) a server, in communication with the diagnostic means and the memory, the server comprising:

(a) means to receive a request from a remote client for the generated operational information;

(b) means to retrieve the generated operational information from the memory means; and (c) means to transmit the generated operational information to the remote client.

BRIEF DESCRIPTION OF THE DRAWINGS

An embodiment of the present invention will be described, by way of example only, with reference to the accompanying drawing, in which.

DETAILED DESCRIPTION OF THE PREFERRED EMBODIMENT

Figure 1:
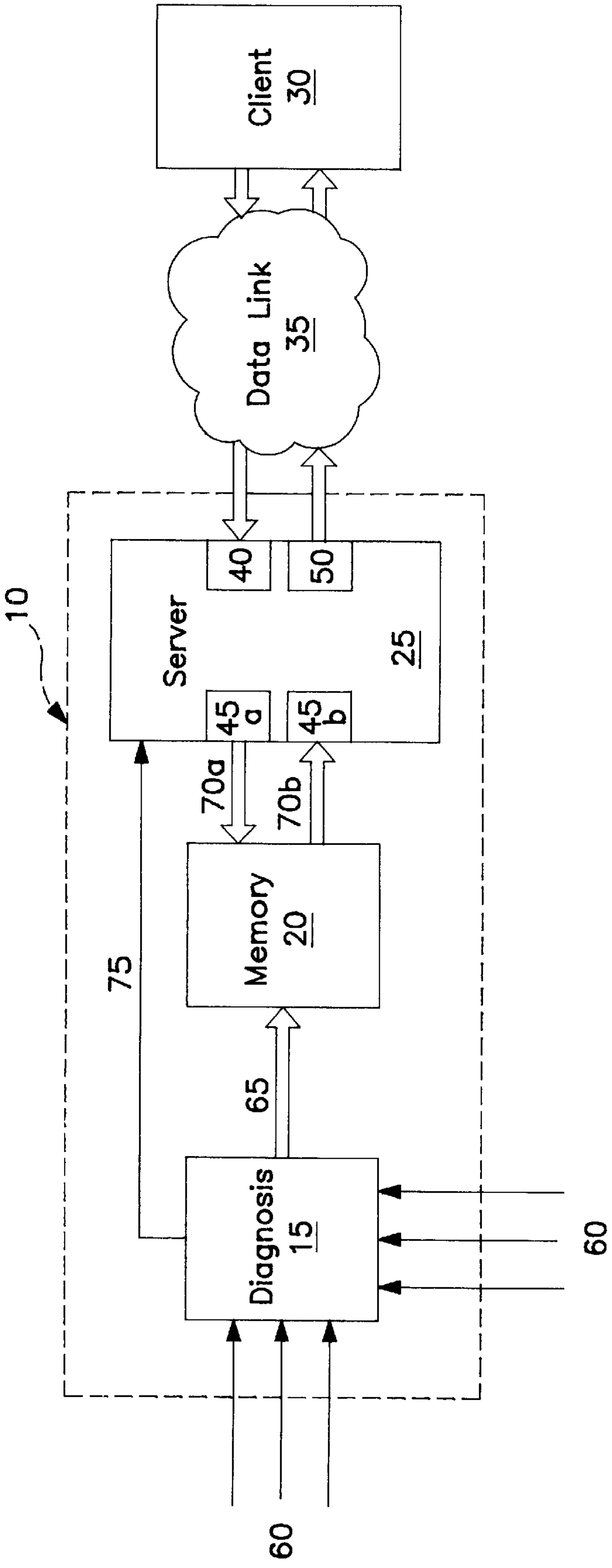
FIG. 1 is schematic representation of a system in accordance with one embodiment of the present invention.

A mobile automotive telemetry system in accordance with the present invention is shown schematically at 10 in FIG. 1. System 10 comprises a diagnostic means 15 for monitoring the operational functions of the vehicle in which system 10 is installed and generating operational information. The generated operational information may be stored in a memory 20 until required. Both diagnostic means 15 and memory 20 are in communication with a server 25 which ultimately controls the operation of system 10.

Server 25 can communicate with a remote client 30 via a data link 35. To this end, server 25 comprises a means (40) to receive a request for information from remote client 30; a means (45*a*, 45*b*) to retrieve the generated operational information from memory 20; and a means (50) to transmit the retrieved generated operational information to remote client 30. Server 25 is a processor which is programmed to respond to requests for information from remote clients and to respond to control commands.

Diagnostic means 15 may be a conventional, computer-based OBD module which monitors various operational functions of the vehicle in which system 10 is located. Diagnostic means 15 may, for example, monitor exhaust emissions, fuel use, ignition timing, engine temperature, speed and/or distance travelled. Diagnostic means receives inputs from the various vehicle sites via a plurality of communication lines 60 and, after interpreting the inputs and generating formatted operational information, passes the operational information to memory 20 via communication line 65. Diagnostic modules suitable for use in the present invention are known in the art and are referred to as Electronic Control Modules (ECM) or Electronic Control Units (ECU). The specifications for the diagnostic modules may be found in Society of Automotive Engineers, "On-Board Diagnostics for Light and Medium Duty Vehicle, Standards Manual" 1997 Edition, the contents of which are incorporated herein by reference.

Memory 20 may be any conventional computer memory, the size and operation of which will be dependent on the nature of the operational features of the vehicle a user wishes to monitor. The choice of suitable memory is believed to be within the purview of a person of skill in the art. In a presently preferred embodiment of the present invention, system 10 comprises a memory 20 which includes 32 k of nonvolatile RAM and a configurable amount of additional RAM, allocated at run-time from the host processor system. Memory 20 receives the operational information, generated by diagnostic means 15, via communication line 65 and stores the operational information. Memory means 20 is in communication with server 20 and is capable of receiving instructions from server 25 and sending information to server 25 via communication lines 70*a* and 70*b*, respectively. As will be apparent to a person of skill in the art, communication lines 70*a* and 70*b* may be replaced by a single communication line if the appropriate communication protocol is used.

Server 25 acts as a gateway between remote client 30 and diagnostic means 15 and eliminates the requirement that remote client 30 has knowledge of the specialist OBD protocols of diagnostic means 15. Server 25 in effect acts as a “universal translator”, allowing a remote client to interact with any diagnostic means of any vehicle. One way of achieving this end is through the implementation of a request/response protocol which acts as a proxy for the corresponding OBD protocols. Under this type of protocol, an abstract request from the remote client which is received by the server is mapped to the corresponding request under the specialist OBD protocols and is then transmitted on the diagnostic means or memory, as appropriate. In the other direction, the responses returned by the diagnostic means or memory to the server are then mapped to an abstract response which is sent back to the client.

Such request/response protocols are known in the art and include, for example, IAS protocol for infrared links and UDP/IP protocol for wide area network communications.

Data link 35 may be any conventional communication link, including, for example, telephony (wired and mobile wireless), specialized mobile radio (SMR), infrared and satellite (both low earth orbit (LEO) and geosynchronous). Server 25 may be provided with the hardware and operational protocols necessary for communicating with remote client 30 by a variety of means, thereby not restricting communication to a remote client having one particular type of data link. Providing server 25 with a plurality of communication protocols aids in making the system of the present invention universally acceptable.

In a presently preferred embodiment, server 25 is provided with infrared data link capabilities. An infrared data link between the server and the remote client provides a local wireless method of acquiring data from an OBD module. It therefore removes the need for the client's equipment to incorporate a system-compatible connector (i.e, an OBD-connector as specified by the SAE) and to be physically joined by a cable in order to communicate with the system.

When, for example, the client is test equipment in a garage, the use of an infrared data link renders possible the development of service bays where information can be transferred almost instantaneously from the vehicle to the service technician's computer without requiring the customer to get out of the vehicle. The infrared connection may be achieved by attaching a serial infrared connector to a serial port on the server and by ensuring that there is an unobstructed path for IR transmission between the LED's of the infrared connector and that of the service technician's computer.

As will be apparent, the reliability of an infrared data link is improved with the implementation of a robust protocol which detects transmission errors and avoids collisions by operating in a half-duplex fashion. Such protocols are known and have, for example, been implemented by computer and software manufacturers for incorporation in consumer electronic products such as micro-computers, modems and cellular phones (i.e. the IrDA stack). Suitable protocols are described in Infrared Data Association, “Serial Inared Link Access Protocol (IrLAP)”, Version 1.1, June 1996 and Infrared Data Association, “Link Management Protocol”, Version 1.1, January 1996, the contents of both of which are incorporated herein by reference.

Through compliance with these infrared protocols, the server achieves a goal of rendering client test equipment independent of the OBD protocols. Accordingly, any micro-computing equipment which is infrared-aware, such as a desk-top, notebook or palm-top (Personal Digital Assistant or PDA) can effectively become a remote client.

In an alternative embodiment, the infrared data link may be replaced or enhanced by incorporating mobile wireless data links, coupled with the UDP/IP infrastructure for peer-to-peer client/server exchanges over a wide area network. This adaptation of the system extends the range of the services offered by the server beyond its capabilities with only the infrared connector and data link. The principles described in the previous sections remain the same, with the exception that access to OBD information no longer requires that the vehicle be moved within infrared detection range (typically 2–5 meters) of the test equipment. The vehicle can be in any location which is reachable on the Internet, via a mobile data link.

The system of the present invention may further comprise a means to transmit generated operational information to a remote client, in the absence of a request from the client, when the generated operational information satisfies predetermined criteria. Such transmissions of the generated operational information implies that server 25 effectively becomes a client with respect to a remote site which is capable of logging the transmission. This functionality can be achieved by utilizing the peer-to-peer communication architecture described above and is useful in, for example, alarm/emergency situations.

If, for example, while monitoring the exhaust emissions of a vehicle on the road, the level of carbon monoxide in the exhaust gases exceeds a predetermined level, the diagnostic means can communicate this information directly to server 25 via communication line 75. Server 25 can then transmit an alarm report to a remote site advising of the problem. This report can be transmitted in real-time, allowing the problem to be dealt with immediately, rather than having to wait until the vehicle undergoes routine servicing and diagnosis, days or even months after the problem has first come to light.

It is envisioned that the threshold values for alarms, as well as the frequency and duration of the alarm message, can be configured either directly at the server during installation or servicing, or by using remote commands from the client.

The system described herein may also incorporate Internet access technology for the drivers or passengers. The existing method of Internet access for individual personal computers (PC) is well-known. The PC establishes a serial link with a computer which has a permanent Internet (IP) address. The latter computer, for the purposes of this description, can be called a gateway. The serial link is physically either a direct cable connection or via a telephone circuit, using modems at both ends of the link. The PC does not have a permanent IP address. It is assigned a temporary IP address by the gateway for the duration of the connection. Therefore, if the link is maintained via a telephone circuit, then the connection automatically terminates when the circuit is dropped and the temporarily assigned IP address ceases to be valid.

One of the conventional methods of Internet access from a vehicle follows the technique described above, using an analog cellular phone and a cellular modem. By connecting the PC to the cellular modem, the driver/passenger can obtain a temporary IP address in the same fashion as with wired telephony.

Another method of Internet access from a vehicle is a technology called Cellular Digital Packet Data (CDPD), which is a form of packet-switching overlaid on the existing analog cellular infrastructure in the United States. CDPD operates with a portion of the bandwidth of the analog cellular system and provides a multiple access data link technology within each cellular base station's territory of coverage. However, contrary to the method already described, the network architecture of CDPD also allows each access device (CDPD modem) to have its own permanent IP address. Therefore, no dial-up connection is required to establish the presence of the PC on the Internet. It suffices for the PC to be connected to the CDPD modem (which is typically in the form of a credit-card style PCMCIA card) for any Internet traffic from another location to reach the PC.

IP V6 is a new version of the Internet Protocol. One of the design objectives of IP V6 is to enable portable computing devices (notebooks, palm-tops, etc.) to have permanent IP addresses which can be reached regardless of where the portable device is physically connected to the Internet. Therefore, the device could be connected, at different times, to both an office LAN (Local Area Network) as well as a residential LAN, without requiring manual intervention by a network administrator in either LAN to ensure delivery of Internet traffic. This is achieved by ensuring that both LAN's have at least one node (computer) which acts as a "Mobility Agent". The Mobility Agent incorporates software which implements IP V6 and related protocols. The purpose of the mobility-related functions in this software is to ensure that roaming computing devices are automatically "discovered" when they establish a link to the Mobility Agent and that the rest of the Internet is informed of the new path which must be used to route traffic to the roaming device. Only those routers in the Internet which have been upgraded to support IP V6 will participate in this function.

A Mobility Agent can reside in a mobile environment as well as a fixed LAN. This scenario is a distinct departure from the existing models of Internet access already described. A mobile Mobility Agent, installed in a vehicle in the form of a mobile computer, can effectively "host" any IP V6-enable portable computing device, provided that it has a wireless data link to a network which is capable of routing packets on the Internet, such as CDPD. The implication is that if a vehicle is equipped with a Mobility Agent using, for instance, CDPD, then any portable device which a driver or passenger wishes to use in the vehicle to obtain access to the Internet does not also need the CDPD modem. It only requires the IP V6 software.

In order to equip any vehicle with IP V6 support, a hardware platform is required to host all of the required protocols and to provide the data links for portable devices trying to connect to the Mobility Agent. In order to support the SAE diagnostic test modes in the remote fashion described herein, the server contains all of the components which will also allow it to function as a mobile Mobility Agent.

It is envisioned that the Infrared port (and IrDA protocols), which is primarily useful for OBD diagnostic test modes while the vehicle is stationary and being examined, can "double" as an in-vehicle wireless point of entry to the internet for portable devices operated by the driver/passengers.

While this invention has been described with reference to illustrative embodiments, this description is not intended to be construed in a limiting sense. Various modifications of the illustrative embodiments as well as other embodiments will be apparent to a person of skill in the art upon reference to this description. It is therefore contemplated that the appended claims will cover any such modifications or embodiments.

What is claimed is:

1. A mobile automobile telemetry system for installation on-board an automobile, comprising:

(i) diagnostic means, in the automobile, for monitoring operational functions of the automobile and generating operational information;

(ii) a memory, in the automobile, for storing the generated operational information; and (iii) a server, in the automobile, and in communication with the diagnostic means and the memory, the server comprising:

(a) means to receive a request from a requesting one of a plurality of remote clients for the generated operational information;

(b) means to retrieve the generated operational information from the memory; and (c) means to transmit the generated operational information to the requesting remote client using a UDP/IP protocol that is universally acceptable to all of said remote clients.

2. The system according to claim 1, wherein the means to receive and the means to transmit comprise wireless communication means.

3. The system according to claim 1, further comprising means to transmit generated operational information to one of said plurality of remote clients, in the absence of a request from said one of said plurality of remote clients, when the generated operational information satisfies predetermined criteria.

4. The system according to claim 1, further comprising an Internet access means, disposed in said automobile.

5. The system according to claim 4, wherein the Internet access means is compliant with IP V6 Internet protocol and allows the server to act as a mobility agent.

6. The system according to claim 1, further comprising means to interface to disparate acquisition sources including a global positioning system (GPS) receiver.

7. The system according to claim 1, wherein said server implements a request/response protocol to act as a proxy for the diagnostic means.

8. A communications network for communicating with a plurality of remote computing entities, said network comprising:

a plurality of automobile data systems, each data system disposed in a corresponding automobile and having:

a diagnostic portion for collecting diagnostic information from said corresponding automobile; and a communications portion for communicating the collected diagnostic information to at least one of the plurality of remote computing entities over a data link, wherein each automobile data system has a UDP/IP protocol which communicates with any one of the plurality of remote computing entities regardless of the data source and without the need for an intermediary.

9. An automobile communications system for communicating with a plurality of remote computing entities, said system comprising:

a plurality of automobile data systems disposed in a corresponding plurality of automobiles, each said automobile data system having:

communications means for communicating with the plurality of remote computing entities over a data link, wherein each automobile data system exchanges data using a UDP/IP protocol in a manner universally acceptable to the plurality of remote computing entities.

10. A system according to claim 9, wherein each automobile data system further comprises:

diagnostic means for generating automobile diagnostic data; and server means for conveying said automobile diagnostic data to one of said plurality of remote computing entities.

11. A system according to claim 10, wherein said diagnostic means collects a portion of the automobile diagnostic data by an OBD protocol, and wherein said server means functions as a proxy for the OBD protocol.

12. A system according to claim 11, further comprising a plurality of data links between said sever means and the remote computing entities.

13. A system according to claim 12, wherein the plurality of data links includes mobile wireless data links.

14. A system for exchanging data between a plurality of automobiles and a plurality of remote computing entities, comprising:

a plurality of diagnostic units correspondingly disposed on the plurality of automobiles; and a plurality of automobile data servers correspondingly disposed on the plurality of automobiles and operable (i) to receive data requests from each of the plurality of remote computing entities, and (ii) to convey to the plurality of remote computing entities, automobile data from said plurality of diagnostic units using a UDP/IP protocol and in a manner that is universally acceptable to all of the plurality of remote computing entities.

15. An automobile traffic communications network for use with a plurality of automobiles, said network comprising:

an onboard diagnostic unit, onboard each of the plurality of automobiles, to monitor onboard automobile functions; and a server, onboard each of the plurality of automobiles, which is operable to receive requests issued by any one of a plurality of remote computing entities, said server using a UDP/IP protocol universally acceptable to each of the plurality of remote computing entities, in order to collect data from the corresponding onboard diagnostic unit and to convey the collected data to said one requesting remote computer entity.

16. An automobile, comprising:

an onboard diagnostic unit that monitors automobile functions; and a server, coupled to said diagnostics unit, which is programmed to respond to requests for information from any one of a plurality of remote clients via one or more data links, said server (i) receiving a request for automobile information from one of said plurality of remote clients, (ii) querying the onboard diagnostic unit for the requested automobile information, and (iii) conveying the requested automobile information to said one of said plurality of remote clients, said server being operable in a UDP/IP protocol to deliver the automobile information in a format that is universally acceptable to said remote computing entities.

17. Apparatus for use in an automobile communications network in which each automobile has an onboard diagnostic unit to monitor onboard automobile functions, and in which a number of remote computing entities are desirous of obtaining data directly from each automobile without control by an intermediary, said apparatus comprising:

a server located in each of the automobiles and operable (i) to receive requests from the remote computing entities, (ii) to communicate with the onboard diagnostic unit on said each automobile in order to collect data therefrom, and (iii) to convey the data to the requesting entity, said server having a UDP/IP protocol which is universally acceptable to all of the remote computing entities.

18. An automobile communications apparatus, comprising:

an onboard diagnostic unit, mounted on the automobile, to monitor onboard automobile functions; and a communications unit, mounted on the automobile, to communicate with a plurality of remote computing entities via one or more data links, said communications unit being operable as a server (i) to receive requests for automobile operations data from any one of said remote computing entities, (ii) to query the onboard diagnostic unit for the automobile operations data, and (iii) to convey the automobile operations data to said one remote computing entity, said server having a UDP/IP protocol which is universally acceptable to all of the plurality of remote computing entities, thereby allowing each of the remote computing entities direct access to the onboard automobile functions through said communications unit without control by a remote intermediary.

* * * * *